(12) United States Patent
Kawaguchi et al.

(10) Patent No.: US 10,832,698 B2
(45) Date of Patent: Nov. 10, 2020

(54) ABNORMAL SOUND DETECTION DEVICE AND ABNORMAL SOUND DETECTION METHOD

(71) Applicant: Hitachi, Ltd., Tokyo (JP)

(72) Inventors: Yohei Kawaguchi, Tokyo (JP); Takashi Endo, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/565,820

(22) Filed: Sep. 10, 2019

(65) Prior Publication Data

US 2020/0251127 A1 Aug. 6, 2020

(30) Foreign Application Priority Data

Feb. 6, 2019 (JP) .................................. 2019-019876

(51) Int. Cl.
*G10L 25/51* (2013.01)
*G06N 20/20* (2019.01)
*G10L 25/18* (2013.01)

(52) U.S. Cl.
CPC .............. *G10L 25/51* (2013.01); *G06N 20/20* (2019.01); *G10L 25/18* (2013.01)

(58) Field of Classification Search
CPC ......... G10L 25/51; G10L 25/18; G10L 99/00; G06N 20/20
USPC ........................................................ 381/56
See application file for complete search history.

(56) References Cited

U.S. PATENT DOCUMENTS

| 2009/0132245 A1* | 5/2009 | Wilson | G10L 21/0208 704/226 |
| 2010/0254539 A1* | 10/2010 | Jeong | G10L 21/0272 381/56 |
| 2013/0070928 A1* | 3/2013 | Ellis | H04R 25/30 381/56 |

FOREIGN PATENT DOCUMENTS

JP 2009-128906 A 6/2009

* cited by examiner

*Primary Examiner* — Vivian C Chin
*Assistant Examiner* — Douglas J Suthers
(74) *Attorney, Agent, or Firm* — Mattingly & Malur, PC

(57) ABSTRACT

An abnormal sound detection device includes a first learning unit that inputs a normal operating sound of the machine equipment, and registers a normal sound base spectrum from an amplitude spectrogram, a new sound/new vibration extraction unit that executes supervised nonnegative matrix factorization (NMF) using the normal sound base spectrum as teacher data on an acoustic signal input during diagnosis, and outputs a nonnegative matrix not allowed to be approximated with a low rank in the normal sound base spectrum, a second learning unit that extracts a new sound/new vibration component from the normal operating sound of the machine equipment, learns a normal sound model from the new sound/new vibration component, and registers the normal sound model, and an abnormality detection unit that computes a probability that the new sound/new vibration component extracted from the acoustic signal of the machine equipment during diagnosis is generated from the normal sound model.

12 Claims, 4 Drawing Sheets

ABNORMAL SOUND DETECTION DEVICE AND ABNORMAL SOUND DETECTION METHOD

CROSS-REFERENCE TO RELATED APPLICATION

The present application claims priority from Japanese application JP 2019-019876, filed on Feb. 6, 2019, the contents of which is hereby incorporated by reference into this application.

BACKGROUND OF THE INVENTION

1. Field of the Invention

The present invention relates to an abnormal sound detection device and an abnormal sound detection method.

2. Description of the Related Art

A state of a machine frequently appears in sound/vibration. Therefore, diagnosis based on a sound/vibration generated from the machine is important to comprehend the state of the machine for the purpose of equipment maintenance, etc. However, when abnormality of equipment is diagnosed based on a sound/vibration, there is a problem that diagnosis may be erroneous. There are two main reasons therefor. One reason is noise originating from other than a diagnosis target, which is an external factor. The other reason is a fluctuation of a normal state of the diagnosis target, that is, a different sound/vibration even in the normal state, which is an internal factor. To solve each problem, a target sound source extraction process and an abnormality detection process are required. In the target sound source extraction process, only an extraneous sound desired to be removed is removed from an input signal, and only a sound of the diagnosis target desired to be extracted is extracted. The abnormality detection process determines abnormality depending on whether the extracted sound of the diagnosis target can be generated with a sufficient probability from a normal sound model estimated based on learning data given in advance.

JP 2009-128906 A is present as a method for solving a problem of target sound source extraction. This publication states "a method for removing noise in a hybrid signal having an acoustic signal and a noise signal including a process of applying constrained nonnegative matrix factorization (NMF) to the hybrid signal, in which the NMF is constrained by a noise removal model, the noise removal model includes a training basic matrix of a training acoustic signal and a training noise signal, and statistics of weights of the training basic matrix, and a weight of a basis matrix of the acoustic signal in the hybrid signal is generated by the application, and a process of obtaining a product of the weight of the basis matrix of the acoustic signal and the training basis matrix of the training acoustic signal and the training noise signal to reconstruct the acoustic signal".

An invention disclosed in JP 2009-128906 A separates a noise mixed signal into sound and noise using the NMF. However, this method works only under a condition that learning data for both the sound desired to be extracted and the noise desired to be removed is given.

On the other hand, since it is generally difficult to collect abnormal sound of a diagnosis target sound source targeted by the invention, learning data of target sound source extraction includes only normal sound. Thus, only learning data of sound desired to be removed is given, and learning data of sound desired to be extracted is not given.

SUMMARY OF THE INVENTION

Therefore, an object of the invention is a target sound source extraction method that allows an abnormality detection process even in a case in which learning data for only sound desired to be removed is given and learning data for sound desired to be extracted is not given.

A preferable example of an abnormal sound detection device of the invention is an abnormal sound detection device for determining presence or absence of an abnormal sound using an operating sound of machine equipment to be diagnosed as an input, the abnormal sound detection device including a first learning unit that inputs a normal operating sound of the machine equipment in advance, decomposes a normal sound base spectrum from an amplitude spectrogram, and registers the normal sound base spectrum in a first database, a new sound/new vibration extraction unit that executes supervised NMF using the normal sound base spectrum of the first database as teacher data on an acoustic signal input during diagnosis, and outputs a nonnegative matrix not allowed to be approximated with a low rank in the normal sound base spectrum as a new sound/new vibration component, a second learning unit that extracts a new sound/new vibration component from the normal operating sound of the machine equipment in advance, learns a normal sound model from the new sound/new vibration component, and registers the normal sound model in a second database, and an abnormality detection unit that computes a probability that the new sound/new vibration component extracted from the acoustic signal of the machine equipment during diagnosis is generated from the normal sound model of the second database.

In addition, a preferable example of an abnormal sound detection method of the invention is an abnormal sound detection method for inputting an operating sound of machine equipment to be diagnosed by a sound collection device and determining presence or absence of an abnormal sound by a calculating machine, the calculating machine having a process of inputting a normal operating sound of the machine equipment in advance, decomposing a normal sound base spectrum from an amplitude spectrogram, and registering the normal sound base spectrum in a first database, a process of executing supervised NMF using the normal sound base spectrum of the first database as teacher data on an acoustic signal input during diagnosis, and outputting a nonnegative matrix not allowed to be approximated with a low rank in the normal sound base spectrum as a new sound/new vibration component, a process of extracting a new sound/new vibration component from the normal operating sound of the machine equipment in advance, learning a normal sound model from the new sound/new vibration component, and registering the normal sound model in a second database, and a process of computing a probability that the new sound/new vibration component extracted from the acoustic signal of the machine equipment during diagnosis is generated from the normal sound model of the second database.

According to the invention, even in a noisy site where an abnormal sound is removed and noise may not be detected by a conventional method such as NMF, it is possible to configure an abnormal sound detection device that allows detection of an abnormal sound of machine equipment to be diagnosed with high accuracy.

DETAILED DESCRIPTION OF THE PREFERRED EMBODIMENTS

Hereinafter, embodiments will be described with reference to drawings.

First Embodiment

In the present embodiment, a description will be given of an example of an abnormal sound detection device that periodically inputs acoustic signals from a sound collection device installed at an appropriate position to collect a sound/vibration of machine equipment to be diagnosed, determines whether an operating sound of the machine equipment to be diagnosed is normal or abnormal, and displays and outputs information about abnormality of the machine equipment when it is determined that the operating sound is abnormal.

Figure 1:
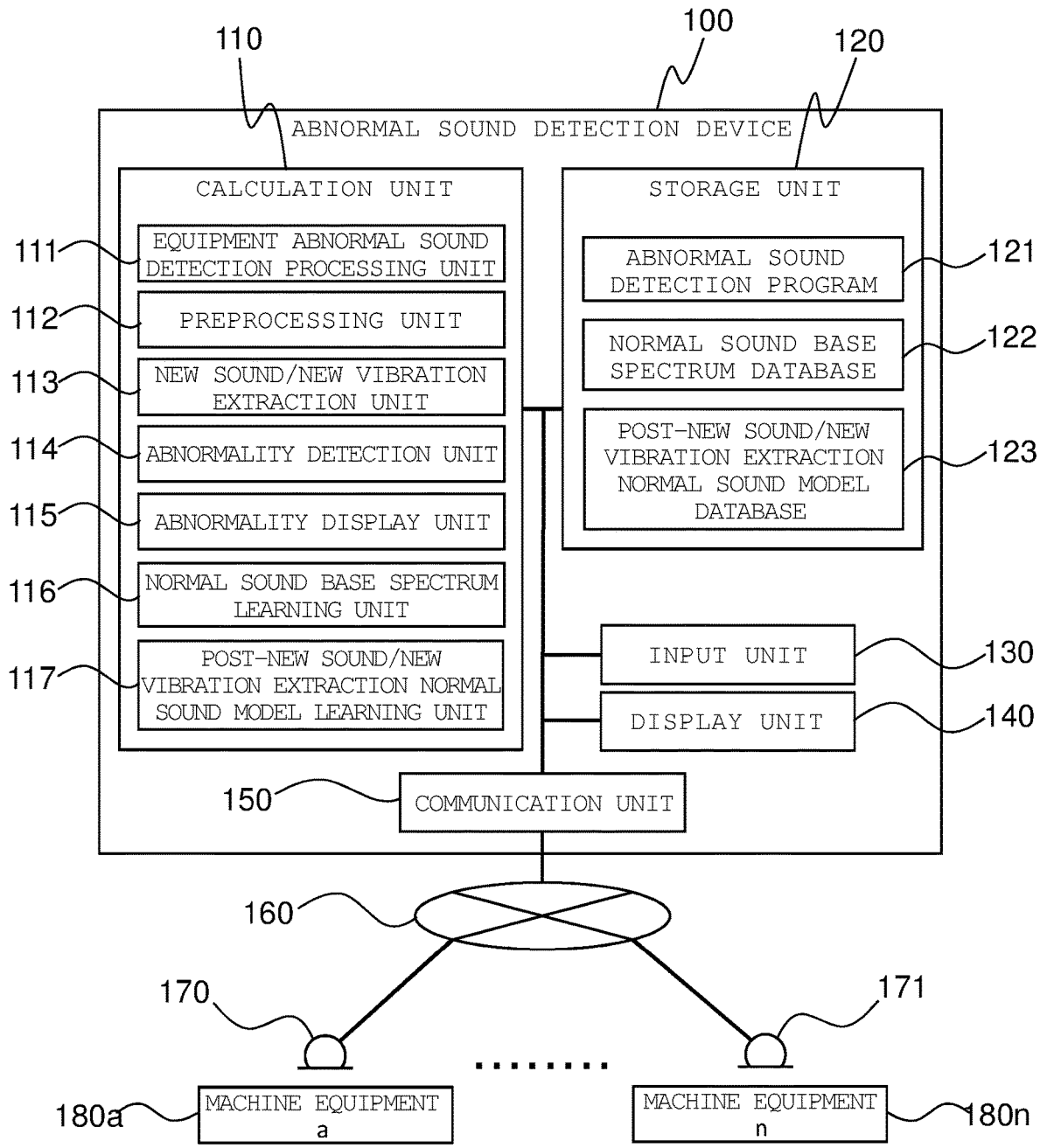
FIG. 1 is a diagram illustrating a configuration of an abnormal sound detection device 100 in the invention.

FIG. 1 is an example of a configuration diagram of an abnormal sound detection device 100.

The abnormal sound detection device 100 can be configured on a general-purpose calculating machine, and a hardware configuration thereof includes a calculation unit 110 including a central processing unit (CPU), a random access memory (RAM), etc., a storage unit 120 including a read only memory (ROM), a hard disk drive (HDD), a solid state drive (SSD) using a flash memory, etc., an input unit 130 including an input device such as a keyboard or a mouse, a display unit 140 including a display device such as a liquid crystal display (LCD) or an organic EL display and various output devices, a communication unit 150 including a network interface card (NIC) and a network interface device, etc.

The communication unit 150 is connected via a network 160 to sound collection devices 170 and 171 including a microphone unit, an analog-digital converter, a communication unit, etc. installed corresponding to machine equipment a (180a) to machine equipment n (180n) on the outside. The network 160 may be a wireless network or a wired network, or may be a separate dedicated cable.

The calculation unit 110 implements the following functional units by loading an abnormal sound detection program 121 stored in the storage unit 120 into the RAM and executing the program by the CPU. The calculation unit 110 includes an equipment abnormal sound detection processing unit 111, a preprocessing unit 112, a new sound/new vibration extraction unit 113, an abnormality detection unit 114, an abnormality display unit 115, a normal sound base spectrum learning unit 116, and a post-new sound/new vibration extraction normal sound model learning unit 117.

The storage unit 120 has a storage area for storing each piece of information of an abnormal sound detection program 121, a normal sound base spectrum database 122, and a post-new sound/new vibration extraction normal sound model database 123.

<<Equipment Abnormal Sound Detection Process>>

Figure 2:
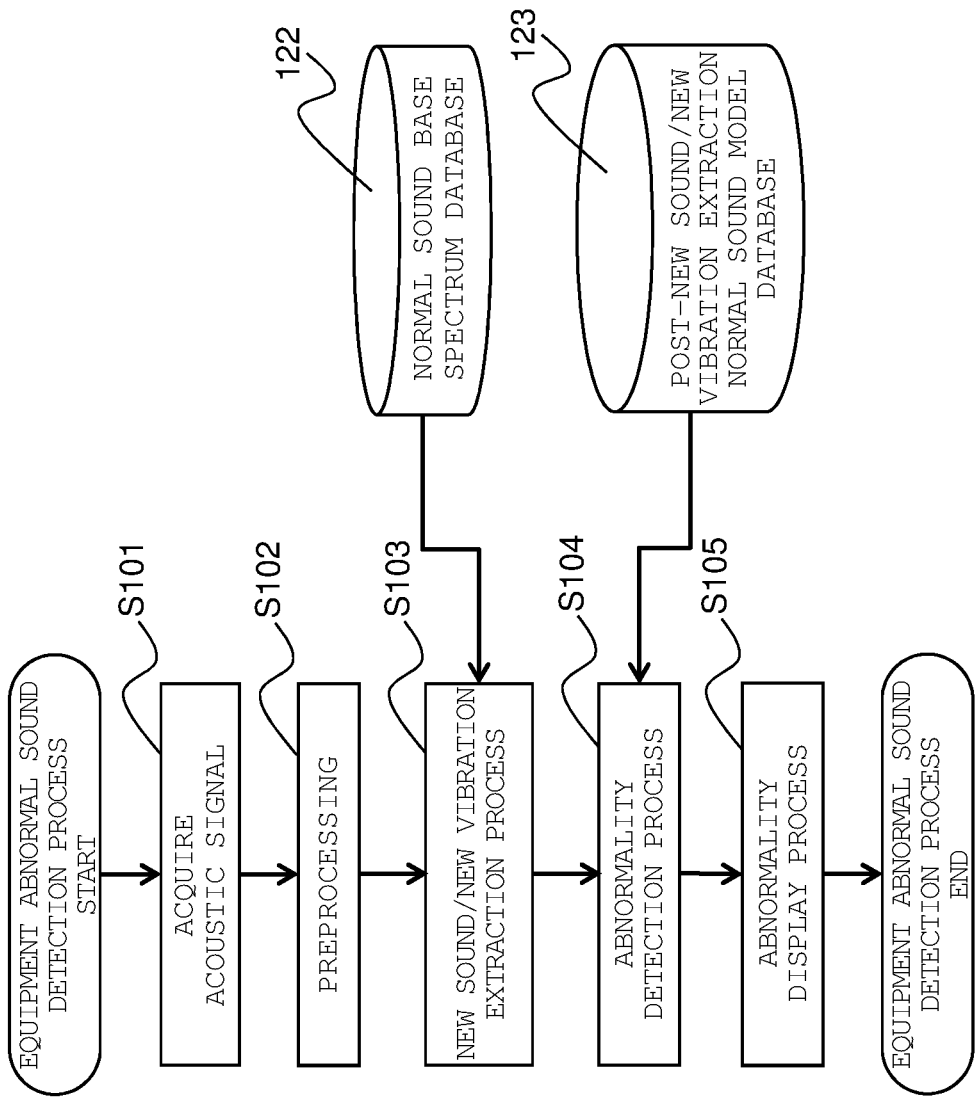
FIG. 2 illustrates a flowchart of an equipment abnormal sound detection process by an equipment abnormal sound detection processing unit 111.

FIG. 2 illustrates a flowchart of an equipment abnormal sound detection process by the equipment abnormal sound detection processing unit 111.

In step S101, an acoustic signal is acquired via the communication unit 150 from the corresponding sound collection devices 170 and 171 installed to collect operating sound of the machine equipment to be diagnosed by being activated every predetermined period. The acoustic signal is input as a time-domain digital signal obtained by converting an analog signal acquired by the microphone of the sound collection device into a digital signal.

In step S102, the preprocessing unit 112 is activated. An input digital signal is divided for each frame, the frame is multiplied by a window function, short-time Fourier transform is performed on the signal after multiplication of the window function, and a frequency domain signal is output. When a frame size is N, the frequency domain signal is a set of K complex numbers in which one complex number corresponds to each of $(N/2+1)=K$ frequency bins.

In step S103, the new sound/new vibration extraction unit 103 is activated. Using a normal sound base spectrum generated by learning in advance from normal sound of the corresponding machine equipment stored in the normal sound base spectrum database 122 (details of a learning process will be described later), the frequency domain signal is separated into a low rank matrix based on the normal sound base spectrum and a non-negative matrix (referred to here as a new sound/new vibration component) that cannot be approximated with a low rank in the normal sound base spectrum. Then, the new sound/new vibration component is output.

In step S104, the abnormality detection unit 114 is activated. Using a post-new sound/new vibration extraction normal sound model generated by learning in advance from the normal sound of the corresponding machine equipment stored in the post-new sound/new vibration extraction normal sound model database 123 (details of a learning process will be described later), it is determined whether a new sound/new vibration extracted from the operating sound of the machine equipment contains abnormality. That is, it is determined whether a new sound/new vibration extracted this time can be generated with a sufficient probability from the post-new sound/new vibration extraction normal sound model. When the new sound/new vibration is not generated with a sufficient probability, it is determined that new sound/new vibration contains abnormal sound.

In step S105, when it is determined that abnormal sound is contained in S104, the abnormality display unit 115 displays a report that abnormal sound has occurred in the corresponding machine equipment on the display unit 140 to issue a notification. When it is determined that abnormal sound is not contained in S104, the process is terminated without particular displaying on the display unit 140.

<<Normal Sound Base Spectrum Learning Method and Data Structure>>

A description will be given of a normal sound base spectrum learning method of learning normal sound of the machine equipment to be diagnosed in advance and registering the learned normal sound in the normal sound base spectrum database 122 prior to implementation of the abnormal sound detection process of the machine equipment to be diagnosed, and a data structure.

The normal sound base spectrum is learned in the following steps.

(1) The normal sound base spectrum learning unit 116 is activated by a command from a user to acquire an acoustic signal using the sound collection device in a state in which any of pieces of commanded machine equipment or parts emitting operating noise can be considered normal.

(2) The preprocessing unit 112 converts the acoustic signal into a frequency domain signal and further converts the signal into an amplitude spectrogram or power spectrogram X {In X, a vertical axis represents time and a horizontal axis represents frequency. X is a matrix of T rows×K columns in which a frequency spectrum created for each frame size (unit period) (including components of the strength (amplitude) of each frequency divided into K areas) is arranged in each row and only an analysis period T is arranged in time series in the vertical axis (time axis)}.

(3) The power spectrogram X is regarded as a matrix of T rows×K columns, and is decomposed by an unsupervised NMF into an activation W that is a matrix of T rows×C columns and a base spectrum H that is a matrix of C rows×K columns, where C is a base number. Any type of NMF such as Euclidean norm NMF, KL divergence NMF, or IS divergence NMF may be used as the unsupervised NMF.

(4) The obtained base spectrum H is stored in the normal sound base spectrum database 122.

Here, the base spectrum stored in the normal sound base spectrum database 122 is a matrix of C rows×K columns as described above, that is, C K-dimensional vectors.

In the case of an environment where a plurality of sound sources is present, the extraction accuracy can be improved by learning a base spectrum of only sound of each sound source. For example, when the machine equipment a, the machine equipment b, and the machine equipment c are present, the base spectrum of only the machine equipment a can be learned by stopping the machine equipment b and the machine equipment c and operating only the machine equipment a. Similarly, for the machine equipment b and the machine equipment c, it is possible to learn a base spectrum including only sound of each sound source. In this case, the base spectrum stored in the normal sound base spectrum database 122 is a matrix of 3×C rows×K columns, that is, 3×C K-dimensional vectors. Thus, the normal sound base spectrum database 122 includes (number of sound sources× number of ranks of normal sound) K-dimensional vectors.

<<New Sound/New Vibration Extraction Process>>

First, the new sound/new vibration extraction unit 103 calculates an amplitude spectrogram or power spectrogram X (matrix of T rows×K columns) using a signal obtained by converting the acoustic signal of the operating sound collected from the machine equipment to be diagnosed into a frequency domain signal by the preprocessing unit 112 as an input.

Then, the new sound/new vibration extraction unit 103 executes supervised NMF to which the base spectrum H of the corresponding machine equipment stored in the normal sound base spectrum database 122 is applied to the power spectrogram X. As represented by the following Equation (1), the new sound/new vibration extraction unit 103 decomposes the power spectrogram X into a normal sound source activation W, a normal sound base spectrum H, and a new sound/new vibration R.

[Equation 1]

$$X = WH + R \quad (1)$$

The new sound/new vibration extraction process is considered as follows.

In the new sound/new vibration extraction, it is considered that the matrices W, H, and R satisfying Equation (2) are calculated. Here, W is a matrix in which vertical vectors of activation of each normal sound source are horizontally arranged, H is a matrix in which vertical vectors of each normal sound base spectrum are horizontally arranged, and R is a matrix representing a new sound/new vibration.

[Equation 2]

$$\min_{W,H,R} \frac{1}{2}\|R\|_F^2 \quad \text{s.t} \quad \left. \begin{array}{l} X = WH + R \\ W, H, R \geq 0. \end{array} \right\} \quad (2)$$

That is, W, H, and R are all non-negative matrices, and the matrices W, H, and R are calculated so that the Frobenius norm (Equation (3)) is minimized under the condition that Equation (1) is satisfied.

[Equation 3]

$$\|R\|_F^2 = \sqrt{\sum_{i=1}^{T} \sum_{j=1}^{K} |r_{ij}|^2} \quad (3)$$

Here, an element in an ith row and a jth column of the matrix R is denoted as symbol $r_{ij}$.

Here, the Alternate Direction Method of Multiplier (ADMM), which is a framework for solving the constrained convex optimization as shown in Equation (2), is introduced. It is known that ADMM converges to a global optimal solution at all times. By ADMM, Equation (2) is replaced by calculating each sub-problem of Equation (4).

[Equation 4]

$$\begin{aligned} W_k &= \operatorname*{argmin}_{W \geq 0} \mathcal{L}(W, H_{k-1}, R_{k-1}, \Gamma_{k-1}), \\ H_k &= \operatorname*{argmin}_{H \geq 0} \mathcal{L}(W_k, H, R_{k-1}, \Gamma_{k-1}), \\ R_k &= \operatorname*{argmin}_{R \geq 0} \mathcal{L}(W_k, H_k, R, \Gamma_{k-1}), \end{aligned} \quad (4)$$

Here, L represents augmented Lagrangian, and k represents the number of iterations.

Here, it is presumed that the normal sound base spectrum $H_k$ is learned and known. Equation (7) is derived from the update formula of the normal sound source activation $W_k$. In addition, Equation (8) is derived from the update formula of the new sound/new vibration $R_k$.

Figure 3:
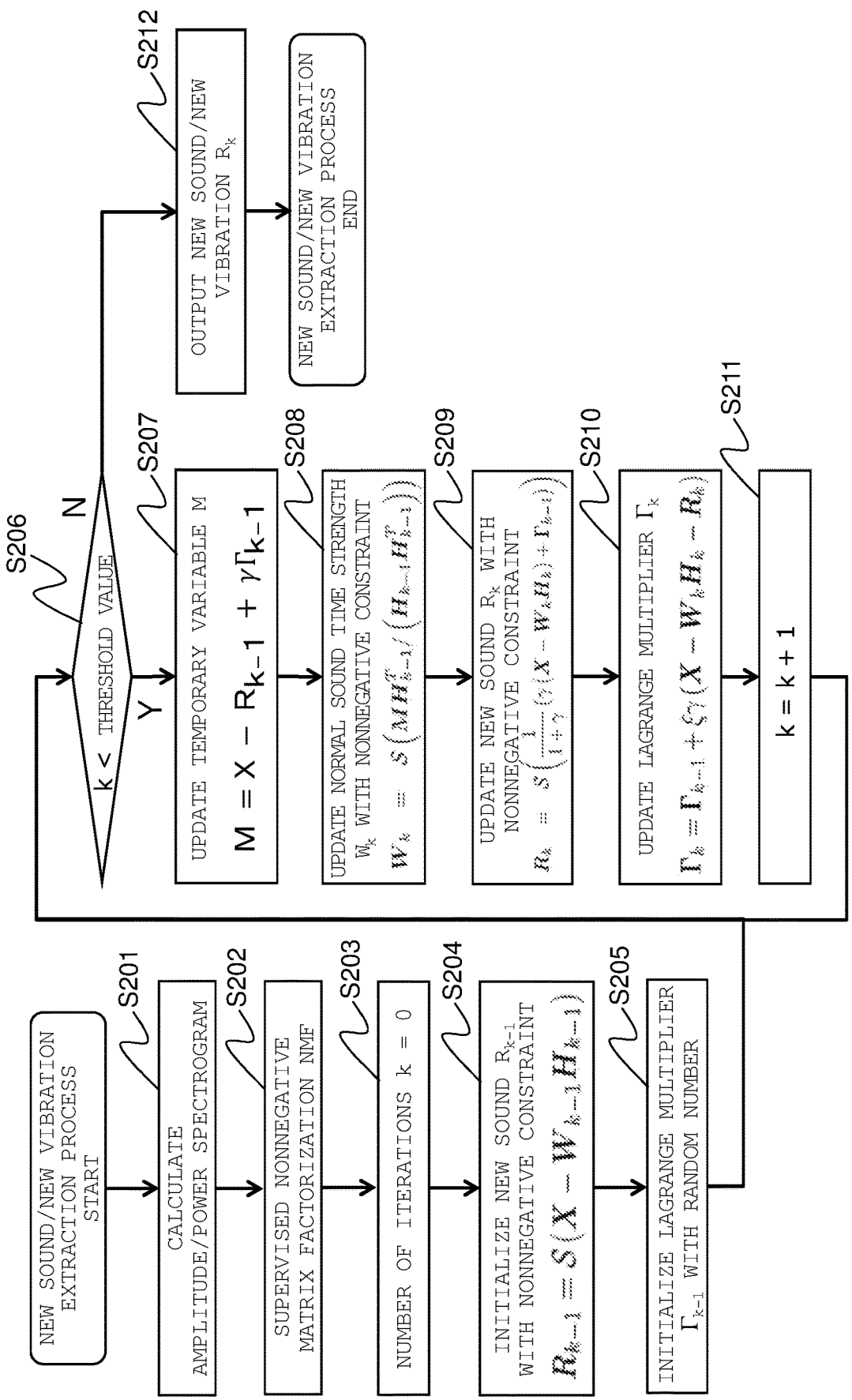
FIG. 3 is a process flow diagram illustrating a flow of a new sound/new vibration extraction process in a first embodiment.

FIG. 3 is a process flow diagram illustrating a flow of the new sound/new vibration extraction process of the present embodiment. In the new sound/new vibration extraction process, first, in step S201, an amplitude spectrogram or power spectrogram X of an input frequency domain signal is calculated.

Subsequently, in step S202, supervised NMF using the normal sound base spectrum H stored in the normal sound base spectrum database 122 is performed on the amplitude spectrogram or power spectrogram X to calculate the activation W of each normal sound source.

Subsequently, in step S203, 0 is substituted into the number of iterations k.

Subsequently, in step S204, the new sound/new vibration $R_{k-1}$ is initialized with a nonnegative constraint by Equation (5). Here, a function S(A) is defined as performing conversion for all elements of a matrix A such that an element is not changed when the element is 0 or more and an element is changed to 0 when the element is 0 or less. That is, a nonnegative matrix is obtained.

[Equation 5]

$$R_{k-1} = S(X - W_{k-1} H_{k-1}) \quad (5)$$

Subsequently, in step S205, a Lagrange multiplier $\Gamma_{k-1}$ is initialized with a random number.

Subsequently, in step S206, it is determined whether k is less than a predetermined threshold value. When k is less than the threshold value, the process proceeds to S207. Otherwise, the process proceeds to S212.

Subsequently, in step S207, a temporary variable M is updated according to Equation (6).

[Equation 6]

$$M = X - R_{k-1} + \gamma \Gamma_{k-1} \quad (6)$$

Subsequently, in step S208, the normal sound source activation $W_k$ is updated with a nonnegative constraint using Equation (7).

[Equation 7]

$$W_k = S(M H_{k-1}^T / (H_{k-1} H_{k-1}^T)) \quad (7)$$

Subsequently, in step S209, the new sound/new vibration $R_k$ is updated with a nonnegative constraint using Equation (8).

[Equation 8]

[Equation 8]

$$R_k = S = \left( \frac{1}{1+\gamma} (\gamma(X - W_k H_k) + \Gamma_{k-1}) \right) \quad (8)$$

Subsequently, in step S210, the Lagrange multiplier is updated using Equation (9).

[Equation 9]

$$\Gamma_k = \Gamma_{k-1} + \xi \gamma (X - W_k H_k - R_k) \quad (9)$$

Subsequently, in step S211, 1 is added to the number of iterations k, and the process proceeds to S206.

Here, the number of iterations k is experimentally or statistically selected in advance so that, for example, the Frobenius norm (Equation (3)) converges to a numerical value below a predetermined threshold.

In step S212, a new sound/new vibration $R_k$ is output and the process ends.

In a case in which learning data for only sound desired to be removed is given and learning data for sound desired to be extracted is not given, when a target sound source is extracted using a conventional method such as NMF in a site having a lot of noise, new sound is removed, and abnormality may not be detected since learning data for the new sound is not present, and thus the new sound can only be extracted as an approximation error of a low-rank approximation of a normal sound base spectrum and may have a negative value due to the fact that the new sound is the approximation error. On the other hand, the present embodiment explicitly imposes nonnegative restriction not only on normal sound but also on new sound for which no learning data is given. For this reason, even when the site is noisy, new sound is not removed, and thus an abnormality can be detected with high accuracy.

<<Post-New Sound/New Vibration Extraction Normal Sound Model Learning Method and Data Structure>>

A description will be given of a post-new sound/new vibration extraction normal sound model learning method based on a new sound/new vibration R extracted by the new sound/new vibration extraction unit 103 by inputting normal sound of the machine equipment to be diagnosed in advance prior to implementation of the abnormal sound detection process of the machine equipment to be diagnosed, and a data structure.

The post-new sound/new vibration extraction normal sound model is learned in the following steps.

(1) The post-new sound/new vibration extraction normal sound model learning unit 117 is activated by a command from a user to acquire an acoustic signal using the sound collection device in a state in which any of pieces of commanded machine equipment or parts emitting operating noise can be considered normal.

(2) A new sound/new vibration R is extracted from the acquired acoustic signal through the preprocessing unit 112 and the new sound/new vibration extraction unit 113. R is a matrix of T rows×K columns.

(3) Respective rows of R are considered as K-dimensional vectors, and a normal sound model is learned using these vectors as inputs. Alternatively, certain L time frames in the vicinity adjacent or thinned in the row direction are combined and considered as L×K dimensional vectors, and a normal sound model is learned using these vectors as inputs.

(4) As the normal sound model, it is sufficient to use a known one-class support vector classifier, a subspace vector of a subspace method, a subspace vector of a local subspace method, a cluster center of k-means clustering, a Gaussian mixture model (GMM), a deep neural network (DNN) autoencoder, a deep autoencoding Gaussian Mixture Model (DAGMM), a convolutional neural network (CNN) autoencoder, a long short term memory (LSTM) autoencoder, a variational autoencoder (VAE), etc.

An algorithm suitable for each model is known and used. For example, in the case of the GMM, fitting is performed by a combination of Gaussian distributions corresponding to a predetermined number of clusters by an EM algorithm.

(5) The learned normal sound model is defined by computed model parameters. All the model parameters are stored in the post-new sound/new vibration extraction normal sound model database 123.

For example, in the case of the GMM, the model parameters stored in the post-new sound/new vibration extraction normal sound model database 123 correspond to a mean vector (L×K dimensions) $\mu_q$ of Q clusters q=1, . . . Q, a covariance matrix of each cluster (L×K×L×K dimensions) $\Gamma_q$, and a weight coefficient of each cluster (1 dimension) $\pi_q$.

<<Abnormality Detection Process>>

The equipment abnormal sound detection processing unit 111 is activated, the operating sound (acoustic signal) of the designated machine equipment to be diagnosed is input, and the new sound/new vibration R is extracted through processing of the preprocessing unit 112 and the new sound/new vibration extraction unit 113. Then, the abnormality detection unit 114 is activated.

For the new sound/new vibration R, the abnormality detection unit 114 reads the post-new sound/new vibration extraction normal sound model learned from the normal sound of the corresponding machine equipment from the post-new sound/new vibration extraction normal sound model database 123 and uses the read model.

The abnormality detection unit 114 inputs a K-dimensional vector of each row of the corresponding new sound/new vibration R or an L×K-dimensional vector obtained by combining L time frames, and computes a probability that the vector v is generated from the post-new sound/new vibration extraction normal sound model.

When the normal sound model is GMM, for example, the abnormality detection unit 114 calculates a probability $p(v|\Theta)$ that the vector v is generated from the post-new sound/new vibration extraction normal sound model (model parameters $\Theta=((\mu_1, \Gamma_1, \pi_1), \ldots (\mu_q, \Gamma_q, \pi_q), (\mu_Q, \Gamma_Q, \pi_Q)))$ according to Equation (10).

[Equation 10]

$$p(v|\Theta) = \sum_{q=1}^{Q} \pi_q N(v|\mu_q, \Gamma_q) \quad (10)$$

Where,

[Equation 11]

$$N(v|\mu_q, \Gamma_q) = \frac{1}{(2\pi)^{1/d}|\Gamma_q|^{1/2}} \exp\left(-\frac{1}{2}(v-\mu_q)^T \Gamma_q^{-1}(v-\mu_q)\right) \quad (11)$$

When the probability $p(v|\Theta)$ is greater than or equal to a predetermined probability, for example, it is determined that the operating sound (acoustic signal) of the machine equipment to be diagnosed is a normal sound. For example, when the probability is less than the predetermined probability, it is determined that an abnormal sound is contained. Alternatively, the probability may be output as a probability including an abnormal sound (abnormality probability).

In this determination, it is considered to include an abnormal sound in an external environment of the machine equipment to be diagnosed, which is presumed to be so small that determination is not affected.

<<Abnormality Display Process>>

The abnormality display unit 115 is activated when the abnormality detection unit 114 determines that the operating sound (acoustic signal) of the machine equipment to be diagnosed includes abnormal sound, and displays that the corresponding machine equipment is emitting abnormal sound on the display unit 140 or notifies an external monitoring system.

In addition to displaying the presence of abnormality, it is possible to compute and display an abnormality degree, an abnormality probability, etc. based on a probability that a current new sound/new vibration is generated from the post-new sound/new vibration extraction normal sound model.

Second Embodiment

In the new sound/new vibration extraction process of the first embodiment, a method of extracting the new sound/new vibration R on the assumption that the normal sound base spectrum H is fixed has been disclosed. In practice, due to machine aging, etc. the normal sound base spectrum H may change compared to the learning time. The present embodiment discloses a method that allows extraction of the new sound/new vibration R even when the normal sound base spectrum H changes from the time of learning.

Figure 4:
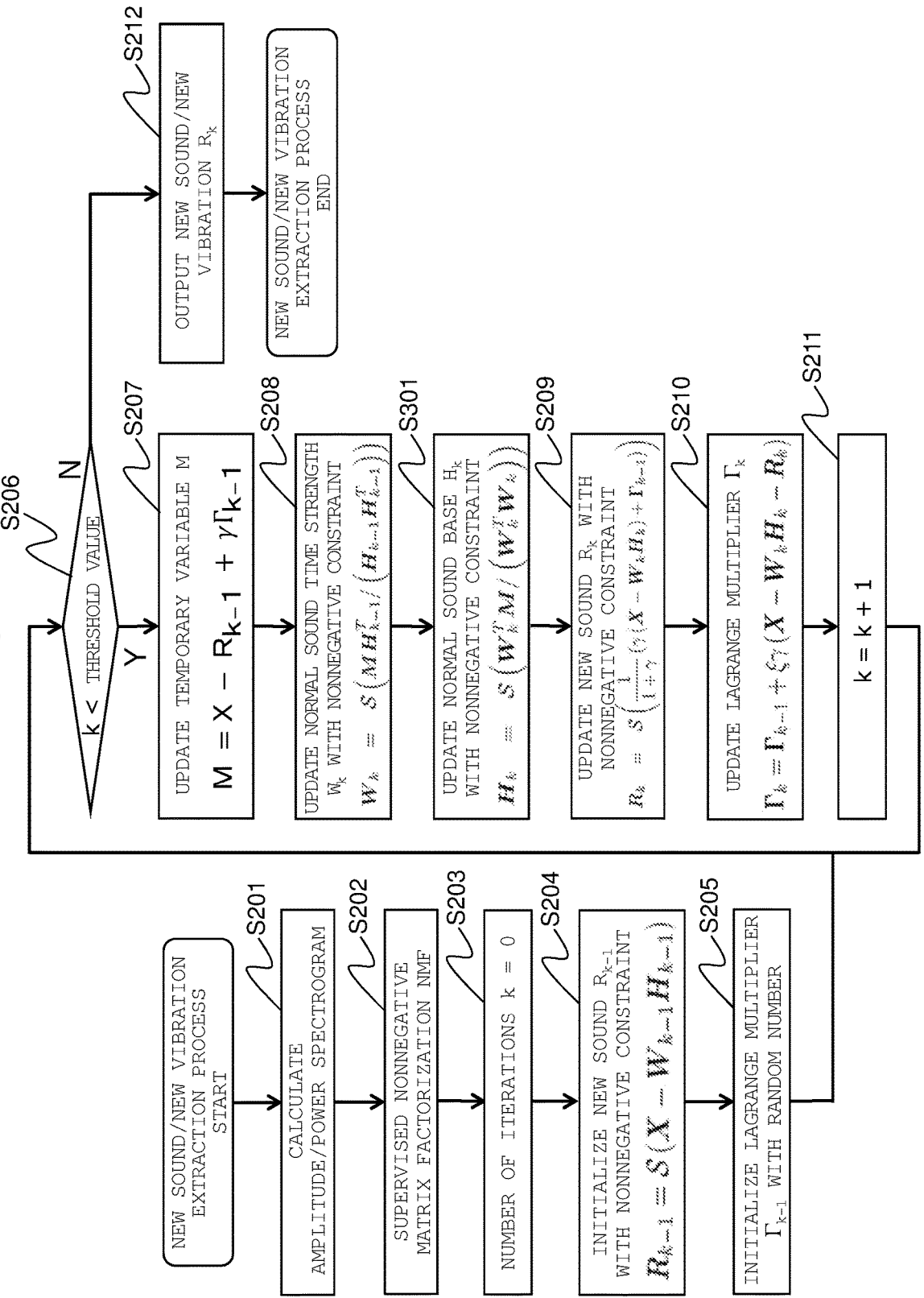
FIG. 4 is a process flow diagram illustrating a flow of a new sound/new vibration extraction process in a second embodiment.

FIG. 4 is a process flow diagram illustrating a flow of a new sound/new vibration extraction process of the present embodiment.

A difference from FIG. 3 is that a normal sound base spectrum $H_k$ nonnegative constrained update (step S301) is inserted between step S208 and step S209, and the normal sound base spectrum $H_k$ is updated by the Lagrange multiplier according to Equation (12) in step S301. Equation (12) is derived from an $H_k$ update equation of Equation (4).

[Equation 12]

$$H_k = s(w_k^T M/(w_k^T w_k)) \quad (12)$$

When the normal sound base spectrum $H_k$ is excessively updated, there may arise a problem that it is difficult to extract a new sound/new vibration $R_k$ due to a secular change. To solve this problem, it is possible to restrict a magnitude of update of $H_k$ to approach the normal sound base spectrum H at the time of learning. For example, it can be realized by using Equation (13) instead of Equation (12).

[Equation 13]

$$H_k = S\left(\varphi \frac{W_k^T M}{W_k^T W_k} + (1-\varphi)H_{-1}\right) \quad (13)$$

Here, $\phi$ is a constant greater than or equal to 0 and smaller than or equal to 1, and $H_{-1}$ is a normal sound base spectrum stored in the normal sound base spectrum database 122. When $\phi=1$, $H_k$ corresponds to Equation (12). When $\phi=0$, $H_k$ corresponds to the first embodiment.

Even in a case in which the normal sound base spectrum H changes when compared to the learning time due to aging of the machine, etc. in the first embodiment, the method disclosed in the present embodiment obtains an effect that the new sound/new vibration R is extracted and abnormality can be detected.

Third Embodiment (Integration with Plurality of New Sound/New Vibration Extraction Results)

The methods disclosed in the first and second embodiments exhibit high extraction accuracy in a case in which an SN ratio is low, and exhibit high extraction accuracy when a residual of conventional supervised NMF or a residual of supervised nonnegative matrix underapproximation (NMU) is used as the new sound/new vibration in a case in which an SN ratio is high. Therefore, in the present embodiment, a method for obtaining high extraction accuracy and consequently high abnormality detection accuracy without depending on the SN ratio is disclosed.

First, as a premise, a normal sound base spectrum is previously learned for each of a plurality of new sound/new vibration extraction methods (supervised NMF, supervised NMU, the first embodiment, and the second embodiment). Further, the post-new sound/new vibration extraction normal sound model disclosed in the first embodiment is learned for each of the new sound/new vibration extraction methods. In addition, a method for abnormality detection that integrates a plurality of new sound/new vibration extraction results by the equipment abnormal sound detection processing unit 111 can be performed by the following two procedures.

(1) One of the plurality of new sound/new vibration extraction methods (supervised NMF, supervised NMU, the first embodiment, and the second embodiment) is selected according to the SN ratio. The SN ratio is computed by a ratio P(R)/P(X) of power P(R) of the extracted new sound/new vibration R to power P(X) of the input sound power spectrogram X. The supervised NMF or supervised NMU is selected when the SN ratio is greater than or equal to a certain threshold value, and the first or second embodiment is selected when the SN ratio is less than the threshold value. Abnormality is detected by a normal sound model learned using the new sound/new vibration R extracted by the selected new sound/new vibration extraction method as an input.

(2) For each of new sound/new vibrations R extracted by the plurality of new sound/new vibration extraction methods (supervised NMF, supervised NMU, the first embodiment, and the second embodiment), abnormality detection using a corresponding normal sound model is individually performed. Then, an average value of abnormality probabilities computed in the respective abnormality detection processes is computed.

The invention is not limited to the above-described embodiments, and includes various modifications. For example, the above-described embodiments have been described in detail for easy understanding of the invention, and may not have all the configurations described. Further, a part of a configuration of a certain embodiment can be replaced with a configuration of another embodiment, and a configuration of a certain embodiment can be added to a configuration of another embodiment. Further, for a part of a configuration of each embodiment, addition/deletion/replacement of another configuration is allowed.

In addition, each of the above-described configurations, functions, processing units, processing means, etc. may be realized using hardware by designing a part or all thereof using, for example, an integrated circuit. In addition, each of the above-described configurations, functions, etc. may be realized using software by a processor interpreting and executing a program that realizes each function. Information such as a program, a table, and a file for realizing each function can be stored in a recording device such as a memory, a hard disk, or a solid state drive (SSD), or a recording medium such as an IC card, an SD card, or a DVD.

What is claimed is:

1. An abnormal sound detection device for determining presence or absence of an abnormal sound using an operating sound of machine equipment to be diagnosed as an input, the abnormal sound detection device comprising:
    a first learning unit that receives a normal operating sound of the machine equipment during a first learning process, decomposes a normal sound base spectrum from an amplitude spectrogram, and stores the normal sound base spectrum in a first database;
    a second learning unit that extracts a first new sound/new vibration component from the normal operating sound of the machine equipment during a second learning process, learns a post-new sound/new vibration extraction normal sound model from the first new sound/new vibration component, and stores the post-new sound/new vibration extraction normal sound model in a second database;
    a new sound/new vibration extraction unit that executes supervised nonnegative matrix factorization (NMF) using the normal sound base spectrum previously stored in the first database as teacher data on an acoustic signal of the machine equipment input during diagnosis, and outputs a nonnegative matrix not allowed to be approximated with a low rank in the normal sound base spectrum as a second new sound/new vibration component; and
    an abnormality detection unit that computes a probability that the second new sound/new vibration component extracted from the acoustic signal of the machine equipment during diagnosis is generated based on the post-new sound/new vibration extraction normal sound model previously stored in the second database and determines whether or not the second new sound/new vibration component is abnormal.

2. The abnormal sound detection device according to claim 1,
    wherein the new sound/new vibration extraction unit converts the acoustic signal input from the machine equipment to be diagnosed into an amplitude spectrogram X, executes supervised nonnegative matrix factorization (NMF) using a normal sound base spectrum H stored in the first database as the teacher data, calculates a normal sound source activation W and a new sound/new vibration component R, and
    iteratively calculates matrices W and R for a predetermined number of iterations so that a Frobenius norm $\|R\|_F$ is minimized under a condition that all matrices W, H, and R defined in Equation (1) correspond to nonnegative matrices and an equation X=WH+R is satisfied:

[Equation 1]

$$\min_{W,H,R} \frac{1}{2}\|R\|_F^2 \text{ s.t } \left\{ \begin{array}{l} X = WH + R \\ W, H, R \geq 0. \end{array} \right\}. \quad (1)$$

3. The abnormal sound detection device according to claim 2, wherein the new sound/new vibration extraction unit iteratively calculates the matrix H in addition to the matrices W and R for the predetermined number of iterations k so that the Frobenius norm $\|R\|_F$ is minimized under the condition that all the matrices W, H, and R defined in Equation (1) correspond to nonnegative matrices and the equation X=WH+R is satisfied, and outputs a new sound/new vibration $R_k$.

4. The abnormal sound detection device according to claim 3, wherein when the new sound/new vibration extraction unit iteratively calculates the matrix H in addition to the matrices W and R for the predetermined number of iterations k so that the Frobenius norm $\|R\|_F$ is minimized under the condition that all the matrices W, H, and R defined in Equation (1) correspond to nonnegative matrices and the equation X=WH+R is satisfied, the new sound/new vibration extraction unit restricts a magnitude of an update of the normal sound base spectrum at iteration k ($H_k$) and imposes a constraint to approach the normal sound base spectrum H during learning.

5. The abnormal sound detection device according to claim 1,
    wherein the new sound/new vibration extraction unit selects one of a plurality of new sound/new vibration extraction methods according to an SN ratio, and extracts the first new sound/new vibration by the selected new sound/new vibration extraction method,
    the second learning unit learns the post-new sound/new vibration extraction normal sound model from the first new sound/new vibration extracted by the new sound/ new vibration extraction method and stores the post-new sound/new vibration extraction normal sound model in the second database, and the abnormality detection unit computes the probability that the second new sound/new vibration extracted from the acoustic signal of the machine equipment during diagnosis is generated from the post-new sound/new vibration extraction normal sound model created by the new sound/new vibration extraction method and previously stored in the second database.

6. The abnormal sound detection device according to claim 1, wherein the new sound/new vibration extraction unit selects a plurality of new sound/new vibration extraction methods from a plurality of new sound/new vibration extraction methods, and extracts respective new sounds/new vibrations by the respective selected new sound/new vibration extraction methods, the second learning unit learns respective post-new sound/new vibration extraction normal sound models from the new sounds/new vibrations extracted by the new sound/new vibration extraction methods, and stores the post-new sound/new vibration extraction normal sound models in the second database, and the abnormality detection unit computes probabilities that the new sounds/new vibrations extracted by the respective new sound/new vibration extraction methods from the acoustic signal of the machine equipment during diagnosis are generated from the post-new sound/new vibration extraction normal sound models created by the new sound/new vibration extraction methods and previously stored in the second database, respectively, and computes an average value of a plurality of probabilities.

7. An abnormal sound detection method for inputting an operating sound of machine equipment to be diagnosed by a sound collection device and determining presence or absence of an abnormal sound by a calculating machine, the calculating machine having a process of inputting a normal operating sound of the machine equipment during a first learning process, decomposing a normal sound base spectrum from an amplitude spectrogram, and storing the normal sound base spectrum in a first database, a process of extracting a first new sound/new vibration component from the normal operating sound of the machine equipment during a second learning process, learning a post-new sound/new vibration extraction normal sound model from the first new sound/new vibration component, and storing the post-new sound/new vibration extraction normal sound model in a second database, a process of executing supervised nonnegative matrix factorization (NMF) using the post-new sound/new vibration extraction normal sound base spectrum of the first database as teacher data on an acoustic signal of the machine equipment input during diagnosis, and outputting a nonnegative matrix not allowed to be approximated with a low rank in the normal sound base spectrum as a second new sound/new vibration component, and a process of computing a probability that the second new sound/new vibration component extracted from the acoustic signal of the machine equipment during diagnosis is generated based on the post-new sound/new vibration extraction normal sound model previously stored in the second database and determining whether or not the second new sound/new vibration component is abnormal.

8. The abnormal sound detection method according to claim 7, wherein in the process of outputting as the second new sound/new vibration component, the calculating machine converts the acoustic signal input from the machine equipment to be diagnosed into an amplitude spectrogram X, executes supervised NMF using a normal sound base spectrum H stored in the first database as the teacher data, calculates a normal sound source activation W and a new sound/new vibration component R, and iteratively calculates matrices W and R for a predetermined number of iterations so that a Frobenius norm $\|R\|_F$ is minimized under a condition that all matrices W, H, and R defined in Equation (1) correspond to nonnegative matrices and an equation X=WH+R is satisfied

[Equation 1]

$$\min_{W,H,R} \frac{1}{2}\|R\|_F^2 \text{ s.t. } \left\{ \begin{array}{l} X = WH + R \\ W, H, R \geq 0 \end{array} \right\}. \quad (1)$$

9. The abnormal sound detection method according to claim 8, wherein in the process of outputting as the second new sound/new vibration component, the calculating machine iteratively calculates the matrix H in addition to the matrices W and R for the predetermined number of iterations k so that the Frobenius norm $\|R\|_F$ is minimized under the condition that all the matrices W, H, and R defined in Equation (1) correspond to nonnegative matrices and the equation X=WH+R is satisfied, and outputs a new sound/new vibration $R_k$.

10. An abnormal sound detection device for determining presence or absence of an abnormal sound using an operating sound of machine equipment to be diagnosed as an input, the abnormal sound detection device comprising:

a non-transitory computer readable storage medium storing at least one program;

a processor configured to execute instructions contained in the at least one program to execute the steps of:

inputting a normal operating sound of the machine equipment during a first learning process, decomposing a normal sound base spectrum from an amplitude spectrogram, and storing the normal sound base spectrum in a first database, extracting a first new sound/new vibration component from the normal operating sound of the machine equipment during a second learning process, learning a post-new sound/new vibration extraction normal sound model from the first new sound/new vibration component, and storing the post-new sound/new vibration extraction normal sound model in a second database, executing supervised nonnegative matrix factorization (NMF) using the post-new sound/new vibration extraction normal sound base spectrum of the first database as teacher data on an acoustic signal of the machine equipment input during diagnosis, and outputting a nonnegative matrix not allowed to be approximated with a low rank in the normal sound base spectrum as a second new sound/new vibration component, and computing a probability that the second new sound/new vibration component extracted from the acoustic signal of the machine equipment during diagnosis is generated based on the post-new sound/new vibration extraction normal sound model previously stored in the second database and determining whether or not the second new sound/new vibration component is abnormal.

11. The abnormal sound detection device according to claim 10, wherein the processor further executes the steps of:

converting the acoustic signal input from the machine equipment to be diagnosed into an amplitude spectrogram X, executes supervised NMF using a normal sound base spectrum H stored in the first database as the teacher data, calculates a normal sound source activation W and a new sound/new vibration component R, and iteratively calculating matrices W and R for a predetermined number of iterations so that a Frobenius norm $\|R\|_F$ is minimized under a condition that all matrices W, H, and R defined in Equation (1) correspond to nonnegative matrices and an equation X=WH+R is satisfied

[Equation 1]

$$\min_{W,H,R} \frac{1}{2}\|R\|_F^2 \text{ s.t. } \begin{Bmatrix} X = WH + R \\ W, H, R \geq 0 \end{Bmatrix}. \quad (1)$$

12. The abnormal sound detection device according to claim 11, wherein the processor further executes the step of:

iteratively calculating the matrix H in addition to the matrices W and R for the predetermined number of iterations k so that the Frobenius norm $\|R\|_F$ is minimized under the condition that all the matrices W, H, and R defined in Equation (1) correspond to nonnegative matrices and the equation X=WH+R is satisfied, and outputs a new sound/new vibration $R_k$.

* * * * *